April 2, 1963 H. M. MIKULSKI ET AL 3,083,696
POSITIONER

Filed May 24, 1961 3 Sheets-Sheet 1

INVENTORS.
Henry M. Mikulski &
BY Eugene F. Holben,
Paul & Paul
ATTORNEYS.

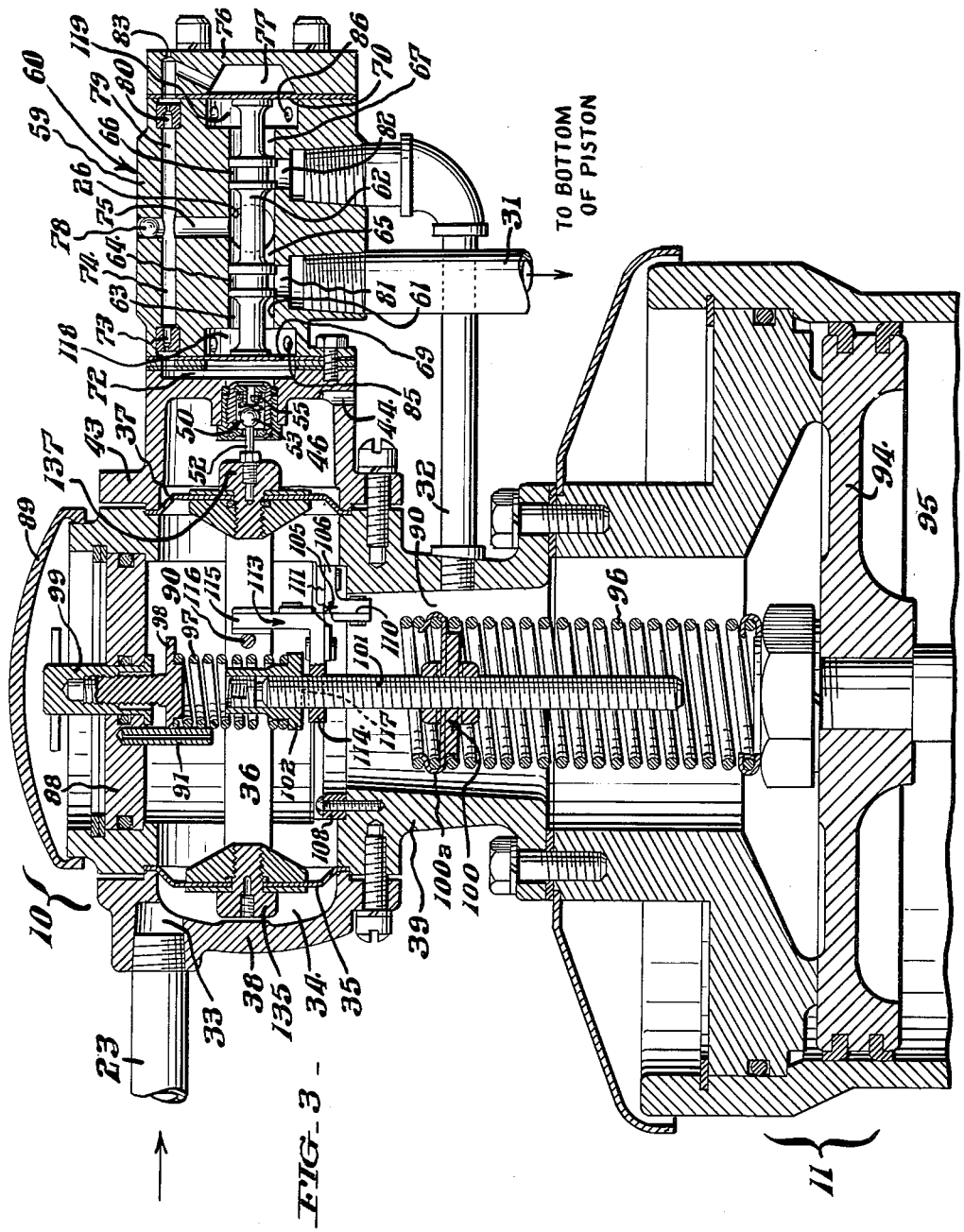

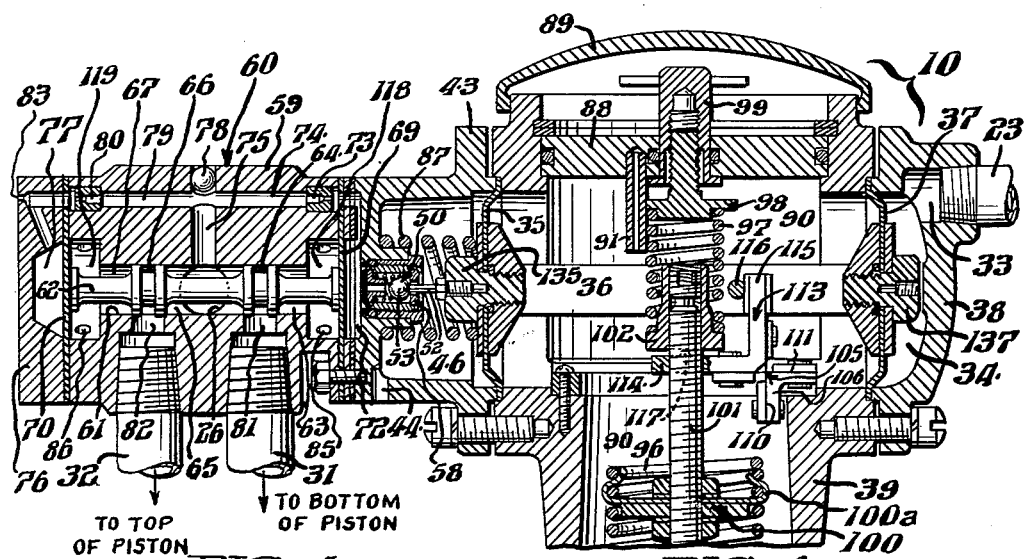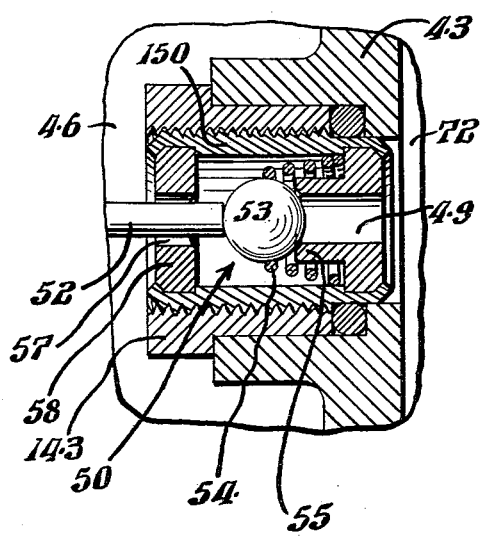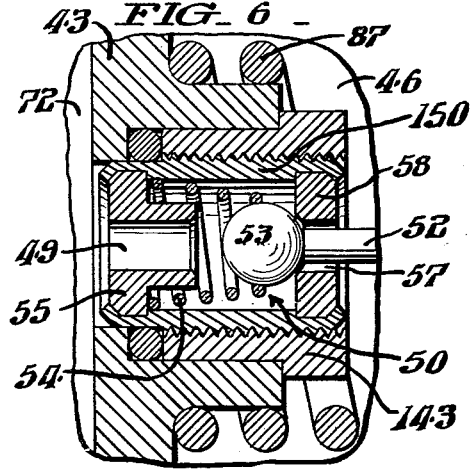

United States Patent Office 3,083,696
Patented Apr. 2, 1963

3,083,696
POSITIONER
Henry M. Mikulski, Philadelphia, and Eugene F. Holben, North Wales, Pa., assignors, by mesne assignments, to Conoflow Corporation, a corporation of Pennsylvania
Filed May 24, 1961, Ser. No. 112,394
6 Claims. (Cl. 121—41)

This invention relates to a fluid-operated control device for controlling the position of a movable member, for example, a valve member.

In many cases it is desirable to alter the position of a primary fluid flow-control valve according to variations sensed elsewhere in such variable conditions as temperature, pressure, rate of flow, and many others. For such purposes, a fluid-operated valve positioner is ordinarily used which in response to a relatively low applied instrumentation signal, usually a varying pressure signal, controls the application of a relatively high fluid supply pressure to the actuator, thereby to alter the condition of the primary fluid flow valve, and thereby to alter the flow of primary fluid in accordance with the instrumentation signal received.

It is an object of the present invention to provide a fluid-operated positioning device which is capable of operating with substantially equal speed in both directions.

Another object is to provide a positioning device in which full reversal of the direction of force of the actuator can be obtained in response to an instrumentation signal.

Another object is to provide a positioning device having a balanced pilot valve which remains balanced despite changes in a relatively high supply pressure but which is sensitive to changes in a relatively low instrumentation pressure.

A more specific object is to provide a valve positioning device in which full supply pressure can be applied to either side of the piston of an actuator while at the same time exhausting the other side.

The manner and means by which the above and other objects and advantages of the present invention are accomplished will be best understood from a consideration of the following detailed description of several preferred embodiments selected for illustration in the drawing in which:

FIG. 3 is a diagrammatic view in side elevation, broken away and enlarged, of the upper part of FIG. 1 as seen along the line III—III of FIG. 2 looking in the direction of the arrows;

FIG. 4 is an enlarged view of the pilot nozzle of FIG. 3;

FIG. 5 is a view, in side elevation, showing the instrumentation pressure and the pilot valve attached to opposite diaphragms as compared with FIG. 3, to provide a reverse acting control; and FIG. 6 is an enlarged view of the pilot nozzle of FIG. 5.

Figure 1:
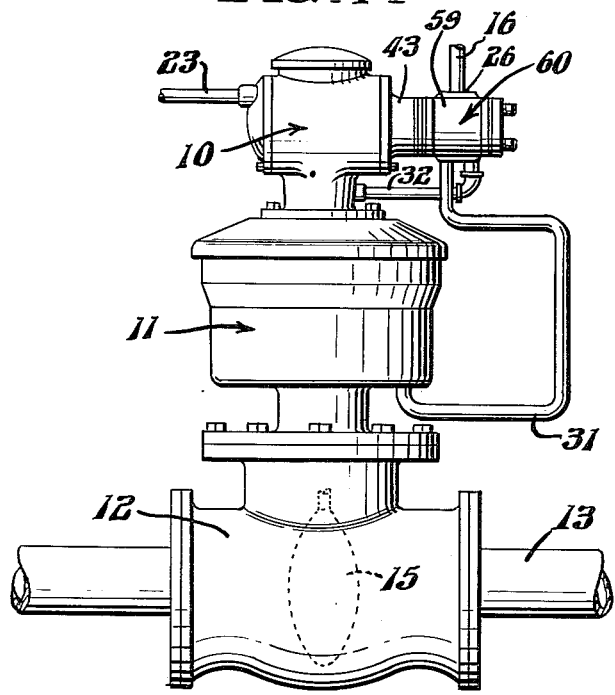
FIG. 1 is a diagrammatic view, in side elevation, of a valve, a valve actuator, and a valve positioner including the supply pressure pilot valve of the present invention.
Figure 2:
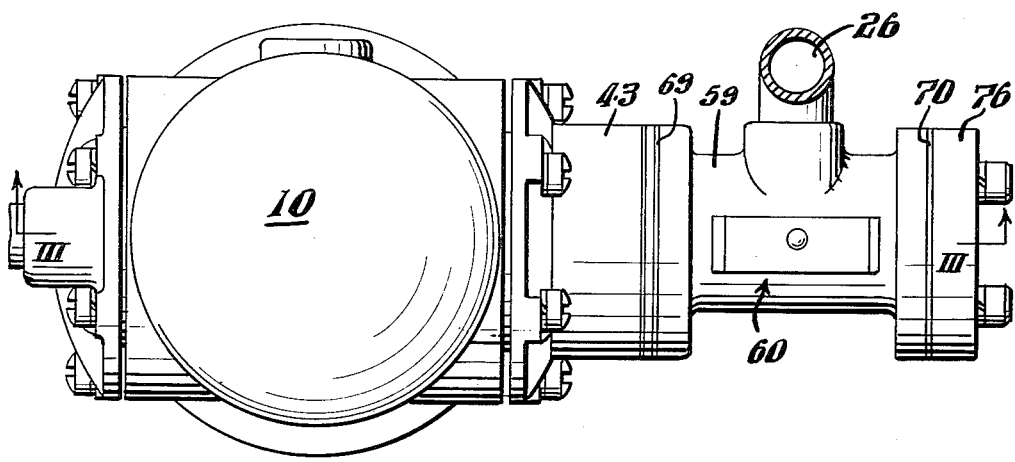
FIG. 2 is an enlarged top view of the valve positioner and pilot valve of FIG. 1.

In describing the preferred embodiments of the invention illustrated in the drawing, specific terminology has been resorted to for the sake of clarity. However, it is not our intention to be limited to the specific terms so selected, and it is to be understood that each specific term includes all technical equivalents which operate in a similar manner to accomplish a similar purpose.

Referring now to FIG. 1, there is shown the general arrangement of a valve positioner 10, a valve actuator 11 controlled by the positioner 10, and a main valve 12 controlled by the actuator 11. The apparatus shown is used to control the rate of flow of primary fluid through pipe 13 according to an instrumentation signal, in the form of a pressure signal, applied to input line 23 of positioner 10 from an instrumentation device (not shown).

The extent to which valve 12 is open or closed is determined by the position of its gate 15. Gate 15 is moved by actuator 11. Actuator 11 includes a piston 94 (FIG. 3) which is movable up and down according to the relative pressures applied to its lower and upper surfaces by the fluid supply pressure in lines 31 and 32, respectively. The fluid pressures in lines 31 and 32 are derived from a source (not shown) of fluid supply pressure connected by input line 16 to input port 26 of a pilot valve 60. Pilot valve 60 controls the application of relatively high supply pressure to the lines 31 and 32 according to the relatively low instrumentation pressure signals applied to the input line 23 of the positioner 10. The pilot valve 60 is, in accordance with the present invention, a balanced valve, and is shown in detail in FIG. 3 together with details of the valve actuator 11 and positioner 10.

Referring now to FIG. 3, the instrumentation signal input line 23 communicates, through input port 33 of cover 38 with the instrumentation pressure chamber 34. The inner wall of chamber 34 is defined by a diaphragm 35 sealed to the main body 39 of positioner 10. The center of diaphragm 35 is connected to one end of a rigid yoke 36 which extends horizontally across the upper chamber 90 of positioning device 10. The other end of yoke 36 is connected to a diaphragm 37 which is also sealed to the main body 39 of positioning device 10.

Secured to main body 39 at the location of diaphragm 37 is a casing 43 which, together with diaphragm 37, forms the chamber 46. Mounted in casing 43 is a variable nozzle 50, shown in enlarged detail in FIG. 4. Nozzle 50 comprises a T-shaped seat 55, a ball 53 normally held away from seat 55 by a spring 54, and a disk seat 58, all held together by a housing 150. Projecting from the center of diaphragm 37 toward ball 53, as seen in FIG. 3, is a pin 52. When positioner 10 is in balance, the pin 52 holds ball 53 against spring 54, partially compressing spring 54, with the ball 53 removed from seat 55 by a clearance which, for example, may be of the order of two-thousandths of an inch. The position of ball 53 is adjustable by adjusting the nozzle housing 150 in the bushing 143.

It will be seen from FIG. 3, that, with a given adjustment of nozzle housing 150, the extent to which the nozzle 50 is open or closed is dependent upon the position of pin 52, which is dependent upon the position of diaphragm 37, which, in turn, is dependent upon the position of the diaphragm 35 of the instrumentation chamber 34.

In accordance with the present invention, there is secured to casing 43 the pressure pilot valve 60 having therein a cylindrical bore 61 in coaxial alignment with yoke 36 of positioner 10. Within bore 61 is an axially movable spool 62 having reduced diameter portions forming three open sections, 63, 65, and 67, separated by two lands 64 and 66. Communicating with the center open section 65 is the input port 26 which is connected by line 16 (FIG. 1) to a fluid supply pressure. In most instances, the pressure of the fluid supply pressure will be many times higher than the instrumentation pressure applied to the chamber 34 of positioner 10.

Pilot valve 60 is a balanced type of valve which when in normal balanced condition blocks the flow of the fluid supply pressure therethrough. However, the balanced condition of pilot valve 60 is readily disturbed, not by any variation in supply pressure, but by the small instrumentation pressure signal applied to positioner 10, and when its balance is disturbed, valve 60 operates to direct full supply pressure to one or the other faces of the piston 94 of the actuator 11, thereby to move the piston 94 in one direction or the other. Thus, by the means shown, the application of a high supply pressure to one or the other sides of the actuator is controlled by the relatively low instrumentation pressure signal applied to the positioner.

Referring again to FIG. 3, it will be seen that pilot valve 60 has two diaphragms 69 and 70, one disposed across each end of spool 62. The left diaphragm 69 seals a recess 72 in the end of casing 43, forming the left chamber 72. The right diaphragm 70 seals a recess 77 in end cover 76 of casing 59, forming the right chamber 77.

The left chamber 72 communicates with chamber 46 of the casing 43 through the bore of the T-shaped seat 55 of ball 53 and the bore 57 of the annular disk seat 58 (but 58 does not function as a seat for ball 53 in FIGS. 3 and 4). Chamber 72 also communicates with the supply pressure input port 26 through a restrictive orifice 73 and the passageways 74 and 75 in pilot valve 60. Ball 78 merely seals passageway 75 from atmosphere.

The outer or right diaphragm 70 of pilot valve 60 as viewed in FIG. 3 seals the recess 77 in the end cover 76 thereby forming the chamber 77 which communicates with the supply pressure input port 26 through the restrictive orifice 80 and the passageways 79 and 75. A fixed restrictive orifice 83 vents the chamber 77 to atmosphere.

Restrictive orifice 73 will ordinarily be of the same size as restrictive orifice 80. The fixed restrictive orifice 83 which vents end chamber 77 to atmosphere is designed to offer the same restriction to air flow as does the combination of openings and passageways which vents chamber 72 to atmosphere when the positioner 10 is in a balanced state and ball 53 is occupying its normal position a small distance away from seat 55. The openings and passageways which vent chamber 72 are seen to include the bore 49 of seat 55, the clearance between seat 55 and ball 53 when the ball is in normal position, the chamber 46 and the vent 44 to atmosphere. Vent 44 is large, so that the pressure in chamber 46 is atmospheric pressure.

It will be seen then that when the positioner 10 is in balanced state, the pressure in chamber 72 is equal to that in chamber 77, each being the same fraction of the total supply pressure applied to input port 26.

With the pressures in end chambers 72 and 77 equal, spool 62 occupies a balanced or centered position in which the closed sections 64 and 66 of the spool block the exit ports 81 and 82 leading respectively to the lines 31 and 32. As seen in FIG. 1, line 31 leads to the lower piston chamber 95 while line 32 leads to the upper chamber 90.

Vertically disposed in upper chamber 90 is a helical tension range spring 96, the lower end of which is secured to the upper face of the piston 94. A threaded rod 101 is supported on the axis of range spring 96 in such position that the upper end of the rod 101 extends above the upper end of the range spring. As shown in FIG. 3, the means for supporting the rod 101 comprises an assembly 100 comprising a pair of locked nuts, a washer and a spring clip 100a which embraces the coils of range spring 96. By adjusting the position of the assembly 100 relative to the spring 96, the number of working coils of the spring may be changed. This is an adjustment which will ordinarily be made at the factory at the time of manufacture and assembly of the positioner.

Rod 101 carries at its upper end a threaded nut 102 having at its lower end a protruding flange on which rests a helical compression spring 97. The upper end of spring 97 is engaged by the flange of a T-member 98, the upstanding portion of which is threaded externally for receiving the threaded bore of an adjusting nut 99. A pin 91 is secured to the head member 88 and extends down through a slot in the flange of T-member 98. Thus, the pin 91 prevents T-member 98 from turning when the adjusting nut 99 is turned. To adjust nut 99, the cover 89 is removed.

The nut 99, T-member 98, pin 91, compression spring 97, and nut 102 together form a zero spring mechanism employed for zero or reference adjustment of the positioner 10.

Secured to casing 39 below the zero adjusting mechanism and above the range spring 96 are a ring 108 and an angle iron 106. Secured to angle iron 106 is a flexure-strip structure 105, comprising a vertical flexure strip 110 and a horizontal flexure strip 111. These flexure strips, being at right angles, cross each other and each is accordingly cut away at the point of intersection to provide clearance for the other.

Secured to flexure strips 110 and 111 is a bell crank 113, the horizontal leg 114 of which is provided with a clearance hole through which the rod 101 passes. The vertical leg 115 extends vertically to a location adjacent to a pin 116 which is secured to and projects horizontally from the yoke 36. Secured to the upper surface of horizontal leg 114 is a knife edge 117 on which nut 102 pivots. Nut 102 is always in contact with knife edge 117.

The functioning of the positioning device of FIG. 3 may be summarized as follows:

The angular position of gate 15 of valve 12 of FIG. 1 is controlled by the elevational position of the piston 94 which, in turn, is controlled by the instrumentation pressure applied by line 23 to the instrumentation chamber 34. Changes in instrumentation pressure cause variable nozzle 50 to change its condition, i.e., to either increase or decrease its opening which, in turn, causes pilot valve 60 to change the relative supply pressures applied to the upper and lower faces of piston 94. Thus, piston 94 is moved in one direction or the other in response to changes in instrumentation pressure. Stated briefly, the apparatus of FIG. 3 functions as a relay which, in response to changes in instrumentation pressure, controls the application of a much higher supply pressure to the piston 94 to move the piston in a direction and to an extent corresponding to the change in instrumentation presure.

The detailed operation of the positioner of FIG. 3 is as follows:

When positioner 10 is in a balanced state, as is the case when the instrumentation pressure is steady, the pressures in end chambers 72 and 77 of pilot valve 60 are equal. The pressures are equal because each chamber is supplied from a common pressure source through input port 26 and then through restrictive orifices 73 and 80, respectively, which are of equal size. Also, each of the chambers 72 and 77 is vented to atmosphere by paths which offer equal restriction when nozzle 50 is in its normal condition. Nozzle 50 is in its normal condition when ball 53 is in that position which gives a desired clearance between it and its seat 55 when the diaphragms 35 and 37 are in their normal balanced positions. Such a position for ball 53 is illustrated in FIG. 4. For adjusting the clearance between ball 53 and seat 55 to a desired distance when the diaphragms 35 and 37 are in their normal balanced positions, nozzle housing is turned rotationally in bushing 143 to move the housing axially, nozzle housing 150 being threadedly held in bushing 143 which is press fitted in casing 43.

Assume that the instrumentation pressure in line 23 increases. When this occurs, diaphragm 35 is moved to the right (as viewed in FIG. 3) and this moves yoke 36 and diaphragm 37 to the right, causing pin 52 to move ball 53 closer toward its seat 55 against the action of spring 54, thus reducing the clearance between ball 53 and its seat 55. This increases the restriction in the venting path of end chamber 72, which path comprises the bore 49 of seat 55, the clearance between the ball and the seat, the bore 57 of seat or disk 58, the chamber 46, and the vent 44. Thus, the pressure in chamber 72 rises. Since the pressure in the other end chamber 77 of pilot valve 60 remains unchanged, the spool 62 moves to the right and input port 26 becomes connected to the exit line 32 through open section 65 of the spool 62. Full supply pressure is thus applied to upper chamber 90 of valve positioner 10. This increases the pressure in chamber 90 and forces the piston 94 downward. When piston 94 moves downward, air from lower chamber 95 is vented to atmosphere through line 31, open section 63 of spool 62, and exhaust ports 85 of the left end chamber 118 of pilot valve 60, thus reducing the pressure in lower chamber 95.

Returning now to a consideration of yoke 36, it will be seen that when yoke 36 is moved to the right as a result of the assumed increase in instrumentation pressure in chamber 34, the pin 116 is moved to the right. Almost immediately thereafter, as a result of the action described above in which the pressure in upper chamber 90 is increased as a result of the operation of pilot valve 60, the piston 94 moves downward, pulling the range spring 96 and rod 101 downward. The nut 102 moves downward, moving the knife 117 downward and causing the bell crank 113 to pivot in a counter-clockwise direction. Thus, the vertical arm 115 of the bell crank moves to the left. Since the vertical leg 115 is always in engagement with pin 116, the yoke 36 is moved to the left, thus moving the diaphragms 35 and 37 to the left and permitting spring 54 of nozzle 50 to return ball 53 to the position which it occupied prior to the assumed increase in instrumentation pressure.

Through the action just described, the diaphragms 35 and 37 are returned to the same positions which they occupied prior to the increase in instrumentation pressure. The instrumentation pressure in chamber 34 is, of course, now higher by an amount equal to the p.s.i. increase in instrumentation pressure which when multiplied by the area of the diaphragm 35, results in an increase in force. But this increase in force is exactly counteracted by the increased force of the range spring 96 which is now under increased tension and pulling with increased force on the bell crank, thus urging yoke 36 toward the left with an increased force which exactly equals the increase in force due to the increase in pressure in instrumentation chamber 34.

Assume now that the instrumentation pressure in line 23 decreases. When this occurs, the diaphragm 35 is moved to the left by the action of the bell crank 113, the horizontal leg of which is being pulled downward by the range spring 96 and the vertical leg 115 of which is pressing against the pin 116 of the yoke 36 with a force equal to that exerted by the pressure acting on diaphragm 35 prior to the assumed decrease.

When yoke 36 and diaphragm 35 move to the left, as just described, diaphragm 37 also moves to the left, pulling pin 52 away from ball 53. Spring 54, however, maintains the ball 53 against the tip of the pin 52, and thus, the clearance between the ball 53 and the seat 55 increases, thereby reducing the restriction of the venting path of chamber 72. The pressure in chamber 72 thus drops, while the pressure in chamber 77 remains unchanged. Spool 62 moves to the left and the input port 26 becomes connected to the line 31 through the open section 65. The supply line pressure is thus applied to the lower chamber 95 increasing the pressure in the lower chamber and causing piston 94 to move upward.

When piston 94 moves upward, the air (or other fluid) in upper chamber 90 is vented to atmosphere through line 32, open section 67, and exhaust ports 86 of the right end chamber 119 of pilot valve 60.

When piston 94 moves upward, as just described, the tension in range spring 96 is reduced, and the reduced force on yoke 36 resulting from the reduced instrumentation pressure in input chamber 34 is now sufficient to return the diaphragm 35 to its normal position against the reduced counterforce being exerted by the range spring 96 through the bell crank 113. When this occurs, yoke 36, diaphragm 37, pin 52, and ball 53 all return to their normal positions. The positioner 10 is again in a balanced state with the reduced force on yoke 36 resulting from the now reduced instrumentation pressure in chamber 34 being exactly balanced by the now reduced tensional force in range spring 96.

Consider now what will happen in the positioner of FIG. 3 in the event there is a change in supply pressure, with no change in instrumentation pressure. In that event, the pressures in end chambers 72 and 77 of pilot valve 60 will both change to the same extent and in the same direction. Thus, the spool 62 will remain in its center balanced position, and both main exit ports 81 and 82 will remain blocked. It will be seen that the positioner of FIG. 3, while sensitive to changes in instrumentation pressure, is insensitive to changes in supply pressure. The fact that the positioner is insensitive to supply pressure changes is an important advantage.

It will also be seen that the positioner of FIG. 3 provides full reversal of supply pressure, i.e., full supply pressure is available to either the top or bottom chambers of the piston. This is an important advantage over prior art systems of which we are aware in which only one-half of the supply pressure is available to move the piston, since one-half of the available pressure is always applied to one side of the piston and the other one-half of the pressure is always applied to the other side of the piston.

It will also be seen that the positioner of FIG. 3 is an equal speed device, i.e., the piston is moved upward or downward at the same rate of speed in response to corresponding changes in instrumentation signal pressure.

The positioner shown in FIG. 3 and described above may be referred to as a "direct acting" positioner, meaning that in response to an increase in instrumentation pressure, the piston is moved in a direction to increase the tension in the range spring.

The present invention is also applicable to what may be referred to as a "reverse acting" positioner. Such a positioner is shown in FIG. 5. In a reverse acting positioner, in response to an increase in instrumentation pressure, the piston is moved in a direction to decrease the tension in the range spring.

The reverse acting positioner of FIG. 5 is similar in many respects to the direct acting positioner of FIG. 3 and like elements are identified by like reference numerals. However, in the reverse acting positioner of FIG. 5, the instrumentation chamber 34 is on the right and the nozzle 50 and pilot valve 60 are on the left of the positioner, i.e., the positions of the instrumentation chamber 34 and of the pilot means (the nozzle 50 and the pilot valve 60) are reversed, as compared with the positioner of FIG. 3.

In addition to having the positions of the instrumentation chamber 34 and pilot valve means reversed, the reverse acting positioner of FIG. 5 differs structurally from the direct acting positioner of FIG. 3 in the following two respects:

It will be recalled that in the direct acting positioner of FIG. 3, the disk 58 does not function as the seat for ball 52. However, in the reverse acting positioner of FIG. 5, the disk 58 does function as the seat for the ball 53 while the T-shaped element 55 does not. Nozzle 50 is so adjusted in FIGS. 5 and 6 that when the positioner is in its normal balanced state the ball 53 is pressed by pin 52, against the action of spring 54, to within a desired clearance of seat 58. The desired clearance may, for example, be two-thousandths of an inch.

The second structural difference is that a compression spring 87 is included in the chamber 46 for opposing the combined force of the instrumentation pressure exerted on diaphragm 37 and the force exerted on pin 116 of yoke 36 by the range spring 96.

To convert the positioner of FIG. 3 to the positioner of FIG. 5, the components lying to the right of diaphragm 37 as viewed in FIG. 3 are interchanged with those lying to the left of diaphragm 35. More specifically, nozzle casing 43 is unbolted from the right side of positioner casing 39 and pin 52 is unscrewed from holder 137. The instrumentation cap 38 is unbolted from the left side of casing 39 and the pin 52 is screwed into holder 135. Casing 59 of pilot valve 60 is unbolted from the nozzle casing 43, and casing 43 is bolted to the left side of positioner casing 39. Compression spring 87 is inserted and the nozzle housing 150 is backed off and adjusted until the desired clearance is obtained between the ball 53 and the seat 58. The casing 59 of the pilot valve 60 is then bolted to the casing 43 of the nozzle 50. The instrumentation cap 38 is bolted to the right side of the positioner casing 39. In this manner, the direct acting positioner of FIG. 3 is converted into the reverse acting positioner of FIG. 5.

Assume, in FIG. 5, that the instrumentation pressure applied to line 23 is increased. When this occurs, the pressure in instrumentation chamber 34 increases and diaphragm 37 moves to the left, causing yoke 36 and diaphragm 35 to move to the left, against the action of compression spring 87. When this occurs, pin 52 moves ball 53 farther away from its seat 58, thus increasing the clearance and thus decreasing the total restriction of the venting path of chamber 72. The venting path includes the bore 49 of the T-shaped seat 55 (not here functioning as a seat), the clearance between the ball 53 and its seat 58, the chamber 46 and the vent 44. The pressure in chamber 72 therefore decreases. Since the pressure in the other chamber 77 of pilot spool 60 remains unchanged, spool 62 moves to the right and the supply pressure at input port 26 becomes connected to line 31 through the open section 65.

As indicated in FIG. 5, line 31 is connected to the bottom chamber 95 of the positioner. Accordingly, the pressure in bottom chamber 95 increases and the piston 94 is forced upward and the displaced air (or other fluid) in upper chamber 90 is exhausted to atmosphere through line 32, open section 67 of spool 62, and exhaust ports 86 of chamber 119.

When piston 94 moves upward, the tension on the range spring 96 is reduced allowing the compression spring 87 in chamber 46 to move the yoke 36 to the right to return yoke 36 to its original position. The reverse acting positioner is then again in a balanced state with the force of spring 87 balanced by the combined opposing forces comprising the force resulting from the instrumentation pressure in chamber 34 acting on diaphragm 35 and the force exerted by the range spring 96. As compared with the balanced condition which existed prior to the assumed increase in instrumentation pressure, the instrumentation pressure on diaphragm 37 is now greater but the force of the range spring is now less, the sum of the two forces again being equal to that exerted by the spring 87.

If, in the positioner of FIG. 5, the instrumentation pressure should decrease, the spring 87 would move the diaphragm 35 and yoke 36 to the right and spring 54 would move ball 53 closer to its seat 58, thus increasing the restriction in the venting path of chamber 72 of pilot valve 60, and thus increasing the pressure in chamber 72. The spool 62 would then move to the left and the supply input port 26 would become connected to the line 32 through the open section 65 of spool 62. As indicated in FIG. 5, the line 32 is connected to the chamber 90, which is above the piston 94, and accordingly the piston 94 is moved downward, moving the bell crank 113 in a counter-clockwise direction until yoke 36 is returned to its original position. Thus, the force of spring 87 is now counteracted by the sum of the forces derived from the smaller instrumentation diaphragm pressure and a larger range spring tensional force.

When piston 94 is moved downward as above described, the displaced air (or other fluid) in lower chamber 95 is, of course, exhausted through line 31, open section 63 of spool 62 and exhaust ports 85 to chamber 118.

It will be seen, then that the reverse acting positioner of FIG. 5 has the same advantages as already recited above with respect to the direct acting positioner of FIG. 3.

In describing the operation of the device, it was pointed out that when the spool 62 is in its center balanced position, the exit ports to lines 31 and 32 are blocked. It should be understood that when the exit ports are blocked, not only is the supply pressure prevented from entering either the upper or lower piston chambers, but the air pressure already in these chambers is prevented from exhausting through the exhaust ports 85 and 86.

It will be seen from the foregoing detailed description of the operation of the positioner of the present invention that the pilot valve 60 may be looked upon as a pneumatic Wheatstone bridge in which the spool 62 is pressure balanced between the diaphragms 69 and 70, and in which the pilot nozzle 50 functions as the variable orifice which is continuously adjusted to balance a fixed orifice. This action is then used to control the supplying and exhausting of air to the chambers above and below the actuator piston, thereby to control the actuator stem position.

While the preferred embodiments of this invention have been described in some detail, it will be obvious to one skilled in the art that various modifications may be made without departing from the invention as hereinafter claimed. For example, while the above description of the preferred embodiments selected for illustration in the drawing have assumed that the pressure fluid is air, other gases or even liquids may be used. Moreover, the actuator need not be a piston. It may be any suitable sort of movable member. Also, the positioner need not incorporate the particular range spring and yoke mechanism illustrated. Other suitable force balance mechanisms may be used.

Having described our invention, we claim:

1. In combination; an actuator; a positioner for said actuator, said positioner having a normally balanced mechanism including a pair of diaphragms joined by a rigid member; means for applying an instrumentation pressure signal to one of said diaphragms to displace said rigid member and to disturb the balance of said mechanism; pilot valve means comprising a spool, a chamber at each end of said spool having as one wall thereof a diaphragm abutting against an end of said spool, an input port adapted to be connected to a fluid supply pressure, two main exit ports each adapted to be coupled to or blocked from said input port according to the position of said spool, and fluid passage means coupling said input port to each of said end chambers; means for connecting one of said exit ports to one side of said actuator and the other of said exit ports to the other side of said actuator; a fixed restrictive vent for one of said pilot-valve end chambers, a variable vent coupling the other of said pilot-valve end chambers to said other of said positioner diaphragms, the arrangement being such that when said fixed and variable vents allow the fluid pressures in said two pilot-valve end chambers to be substantially equal, said spool occupies a centered balanced position and said positioner mechanism is balanced, said spool when centered being adapted to block communication from both main exit ports to said input port, said spool being adapted to be moved in one direction or the other in response to a change in said variable venting means due to an unbalance in said positioner mechanism to open one of said normally-closed main exit ports and to continue to block the other, thereby to apply supply pressure to a corresponding one side of said actuator and to continue to block the application of supply pressure to the other side of said actuator; and resilient mechanical means in said positioner having an axis coaxial with that of said piston and perpendicular to that of said rigid member for connecting said actuator to said rigid member, the reaction force of said resilient mechanical means along said perpendicular axis effecting the repositioning of the initially displaced rigid member on its own axis and the repositioning of said variable vent to allow said spool to return to a centered balanced position.

2. In an apparatus for controlling the movement of an actuator in response to a variable; a positioner chamber including aligned and opposed flexible sealing diaphragms of equal size and shape; control means external of said chamber for exerting on one of said diaphragms a pressure which varies with said variable; a rigid member within said chamber connecting said diaphragms for coincident displacement along the axis of said rigid member; pilot valve means coupled to the other of said diaphragms, said pilot valve means having an inlet port adapted to be coupled to a source of fluid supply pressure, a pair of exit ports adapted for internal communication with said inlet port, one exit port being adapted to be coupled to said positioner chamber on one side of said actuator and the other exit port being adapted to be coupled to the opposite side of said actuator, a spool adapted to be pressure balanced by said supply pressure, said spool having two lands which when said spool is in its balanced centered position are adapted to block communication from said inlet port to both said exit ports, end chambers, one at each end of said spool, each end chamber having as one wall thereof a diaphragm abutting against one end of said spool; a restrictive passage coupling said inlet port to each of said pilot-valve end chambers; a fixed restrictive exhaust vent for one of said pilot-valve end chambers; a variable restrictive exhaust vent for the other of said pilot-valve end chambers, said variable restrictive exhaust vent including variable nozzle means coupled to said other of said diaphragms of said positioner and responsive to displacement of said rigid member in response to a change in control pressure for changing the pressure in said other pivot-valve end chamber to move said spool from its balanced centered position to unblock one only of said exit ports from said inlet port, thereby to apply fluid supply pressure to one side only of said actuator according to the direction of movement of said spool, and restrictive exhaust means adapted to exhaust said other side of said actuator when supply pressure is applied to said one side; said positioner means including resilient mechanical means having an axis coaxial with that of said actuator and perpendicular to that of said rigid member for connecting said actuator to said rigid member, the reaction force of said resilient mechanical means along said perpendicular axis effecting the repositioning of the displaced rigid member on its own axis, thereby to reposition said variable nozzle means of said pilot-valve to allow said spool to return to its balanced centered position.

3. Apparatus as claimed in claim 2 characterized in that said exit ports of said pilot valve means are so connected that movement of said spool from its centered balanced position in a direction which is in response to an increase in control pressure unblocks that one of said exit ports which is adapted to apply fluid supply pressure to said positioner chamber on the top side of said actuator to move said actuator farther away from said rigid member.

4. Apparatus as claimed in claim 2 characterized in that said exit ports of said pilot valve means are so connected that movement of said spool from its centered balanced position in a direction which is in response to an increase in control pressure unblocks that one of said exit ports which is adapted to apply fluid supply pressure to the bottom side of said actuator to move said actuator closer to said rigid member.

5. In a fluid pressure controlled actuator positioner; a chamber having axially aligned opposed diaphragms of substantially equal surface area sealing said chamber; a rigid member within said chamber connecting said diaphragms; control means external of said chamber for exerting a control fluid pressure on the external surface of one of said diaphragms for effecting an initial displacement of said rigid member along its axis; an actuator in said chamber movable along an axis substantially perpendicular to that of said rigid member; pilot valve means coupled to the external surface of the other of said diaphragms and responsive to movement thereof in a direction coaxial with the axis of said rigid member for controlling the application of a supply fluid pressure for controlling the position of said piston, said pilot valve means including a spool adapted to be pressure balanced between first and second spaced-apart diaphragms by a fluid supply pressure substantially higher than said control fluid pressure, said first and second pilot-valve diaphragms defining first and second chambers, one at each end of said spool, one of said pilot-valve chambers having a fixed exhaust orifice and the other having variable orifice exhaust means, said variable orifice exhaust means including a nozzle coupled to the other diaphragm of said positioner chamber and adapted to be varied in accordance with variations in said control fluid pressure; and mechanical means including resilient means having an axis coaxial with that of said piston and perpendicular to that of said rigid member for connecting said piston to said rigid member such that the reaction force of said resilient means along said perpendicular axis effects the repositioning of said initially displaced rigid member on its own axis.

6. Apparatus as claimed in claim 5 characterized in that said pilot valve means includes an input port adapted to be connected to said substantially higher fluid supply pressure, two main exit ports adapted to be coupled to or blocked from said input port according to the position of said spool, restrictive means coupling said input port to each of said first and second chambers of said pilot-valve means, and means for connecting said exit ports to opposite sides of said actuator.

References Cited in the file of this patent
UNITED STATES PATENTS

| | | |
|---|---|---|
| 752,491 | Warren | Feb. 16, 1904 |
| 2,625,136 | Moog | Jan. 13, 1953 |
| 2,896,588 | Hayner et al. | July 28, 1959 |
| 2,993,498 | Brand | July 25, 1961 |